Figure 1:
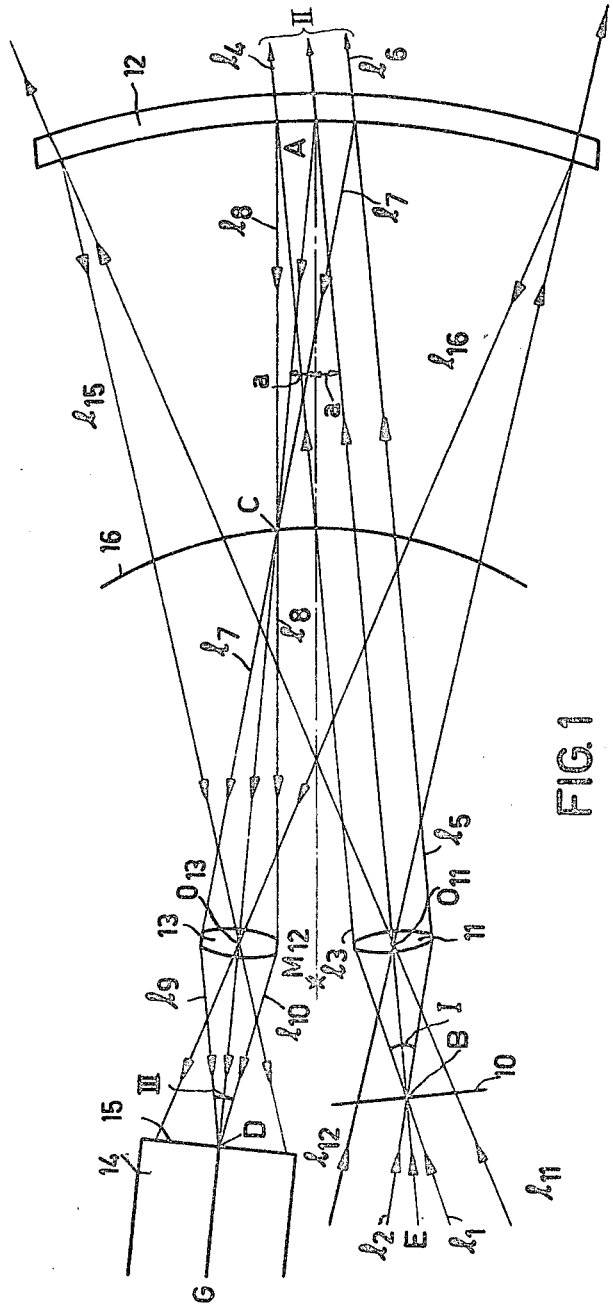

Nov. 2, 1965   H. DE LANG ETAL   3,215,032
DEVICE FOR PROJECTING A CONFIGURATION ON A FLAT CARRIER
SIMULTANEOUSLY ONTO PROJECTION SCREEN AND A PICK-UP
TUBE OF A TELEVISION CAMERA WITH THE AID OF
THE SAME PROJECTION OBJECTIVE
Filed June 5, 1961   5 Sheets-Sheet 1

INVENTOR
HENDRIK DE LANG
JOSUE J. PH. VALETON
BY
AGENT

INVENTOR
HENDRIK DE LANG.
BY JOSUE J.PH VALETON.
AGENT

Nov. 2, 1965  H. DE LANG ETAL  3,215,032
DEVICE FOR PROJECTING A CONFIGURATION ON A FLAT CARRIER
SIMULTANEOUSLY ONTO PROJECTION SCREEN AND A PICK-UP
TUBE OF A TELEVISION CAMERA WITH THE AID OF
THE SAME PROJECTION OBJECTIVE
Filed June 5, 1961  5 Sheets-Sheet 4

INVENTOR
HENDRIK DE LANG.
BY JOSUE J.PH. VALETON.
AGENT

# United States Patent Office 3,215,032
Patented Nov. 2, 1965

3,215,032
DEVICE FOR PROJECTING A CONFIGURATION ON A FLAT CARRIER SIMULTANEOUSLY ONTO PROJECTION SCREEN AND A PICK-UP TUBE OF A TELEVISION CAMERA WITH THE AID OF THE SAME PROJECTION OBJECTIVE
Hendrik de Lang and Josue Jean Philippe Valeton, Eindhoven, Netherlands, assignors to North American Philips Company, Inc., New York, N.Y., a corporation of Delaware
Filed June 5, 1961, Ser. No. 114,762
Claims priority, application Netherlands, June 4, 1960, 252,340
2 Claims. (Cl. 88—24)

A device for projecting a configuration on a carrier simultaneously onto a projection screen and a pick-up tube of a television camera with the aid of the same projection objective is known. Such a carrier is remote from the main surface, adjacent the object, of a projection objective forming part of the device at a distance at least equal to the focal length of the objective.

The use of such a device, more particularly in existing projectors, involves certain practical disadvantages. In fact, the projection objective in such a projector is usually deeply countersunk so that projection of the image onto the pick-up tube of the television camera in a manner free from vignette is not readily possible with simple means.

An object of the invention is to provide an improvement of the kind mentioned in the preamble, which permits of mitigating this disadvantage. This results in structures which are also applicable to existing projectors in a very efficacious manner.

To this end, a device according to the invention is characterized in that it comprises not only a camera objective arranged in front of the pick-up tube of the television camera, but also a concave spherical mirror, the projection objective and the camera objective having conjugated positions relative to the concave spherical mirror and the distance between each objective and the concave spherical mirror, as measured along the optical axes which may have the form of refracted lines, corresponding at least substantially to the radius of curvature of the concave spherical mirror.

The concave spherical mirror present in the device provides for projection of both the object and the pupil. The projection of the pupil is substantially free from aberration and the projection of the object is of very satisfactory quality, since the relevant mirror is used under favourable conditions. Owing to both the projection objective and the camera objective being remote from the said mirror a distance substantially equal to the radius of curvature thereof, the diaphragm lies substantially at the centre of curvature of the mirror. A device according to the invention affords the further practical advantage that the various optical parts which have to be arranged behind the projection objective need a comparatively small space.

Whenever in this specification reference is made to a configuration on a carrier, this is to be understood to mean not only a film frame or a diapositive which is to be projected, but for example also an opaque carrier provided with a configuration which is to be projected epidiascopically.

In addition, the device is suited not only for projection onto a screen arranged at a comparatively large distance from the projector, as is the case for example in a movie theatre. It can also be used if the distance between the projector and the screen is considerably smaller, as is the case, for example, when the projector is used in a space of limited dimensions, for example in a living room. In the first case, the carrier with the configuration will be arranged at a distance from the projection objective about equal to the focal length thereof, but in the second case usually at a distance which is a little larger than the focal length.

With reference to the invention, it is possible to arrive at different embodiments thereof.

Thus, a first embodiment of the device according to the invention is characterized in that while the optical axes of the projection objective and of the camera objective, at least in the vicinity of the concave mirror, are at an angle of not more than 10° to each other and the centre of curvature of the mirror lies on the bisector of this angle, the relevant mirror is made of clear material, such as glass, and the projection beams directed towards the screen pass through this mirror. In this embodiment, a plane mirror may be arranged in inclined position in the path of rays between the concave mirror and the camera objective, which provides greater freedom in the choice of the position of the camera objective relative to the projection objective. Both these embodiments have the advantage that the position of the projection objective relative to the projection screen can correspond to the relative positions of these two parts in conventional arrangements of film projectors.

Another embodiment of the device according to the invention is characterized in that a plate which is partly reflective and partly translucent is arranged in inclined position in the path of rays between the projection objective and the concave spherical mirror, the light emanating from the projection objective, after having been reflected by this plate, being directed towards the projection screen, whereas the light which passes through this plate falls on the concave mirror and, after having been reflected by this mirror, on the camera objective. Because of the simplicity of design it is advantageous that the light reflected by the concave mirror is thrown onto that side of the partly reflective and partly translucent plate, arranged behind the projection objective, which is remote from the projection objective and provided with a reflecting layer and that the light is directed by this plate towards the camera objective. In these embodiments, the optical axes of the projection beams emanating from the projection objective and directed towards the screen are refracted.

In another embodiment of the device according to the invention, a plate which is partly reflective and partly translucent, is arranged in inclined position in the path of rays between the projection objective and the concave spherical mirror, the light emanating from the projection objective, after having passed through this plate, being directed towards the projection screen, whereas the light which is reflected by this plate reaches the spherical concave mirror and is directed by it towards the camera objective. A projector is thus obtained in which the position of the projection objective with respect to the projection screen is the usual one, while the auxiliary means required for obtaining an image for the television camera may be arranged at the emergence side of the projection objective without the disadvantage of insufficient space being involved. In another embodiment, the camera objective may be located directly opposite the concave spherical mirror on that side of the partly translucent and partly reflective plate, arranged behind the projection objective, which is remote from the said mirror. In this embodiment it is also possible to interpose another plate in inclined position between the concave mirror and the partly translucent and partly reflective plate, this second plate being likewise partly translucent and partly reflective and deflecting the light from the spherical mirror towards the camera objective. This results in a more compact arrangement of the various parts.

The following may be further remarked with regard to the partly translucent and partly reflective plate employed in the device, which has the task to divide the light beams emerging from the camera objective. The light flux directed towards the projection screen must be proportionally much greater than that directed towards the camera objective. Consequently, if the light directed towards the screen must pass through this plate, the relevant plate will usually be made of wholly translucent material. The light which is reflected by the surfaces of the plate is of an intensity sufficient to provide for an efficacious light flux to the camera objective. If, however, the illumination of the projection screen is provided by the light reflected by this plate, the relevant plate may be such that the light flux directed towards the projection screen is of an intensity greater than would be the case if use would be made only of the reflective properties of the surfaces of the plate. For this purpose one surface may be silvered in part. In order to avoid image duplication in the camera objective, it is advantageous to provide such a mirror on the side of the plate remote from the projection screen.

In another embodiment of the invention, likewise to avoid image duplication, the two boundary surfaces of the partly translucent and partly reflective plate may be at a very small angle of, for example, not more than 3° to each other.

In order to avoid the distortion of the focal field which occurs at the screen of the pick-up tube, it is in certain cases preferable to position a positive correcting lens in front of the pick-up screen of the television camera.

Figure 2:
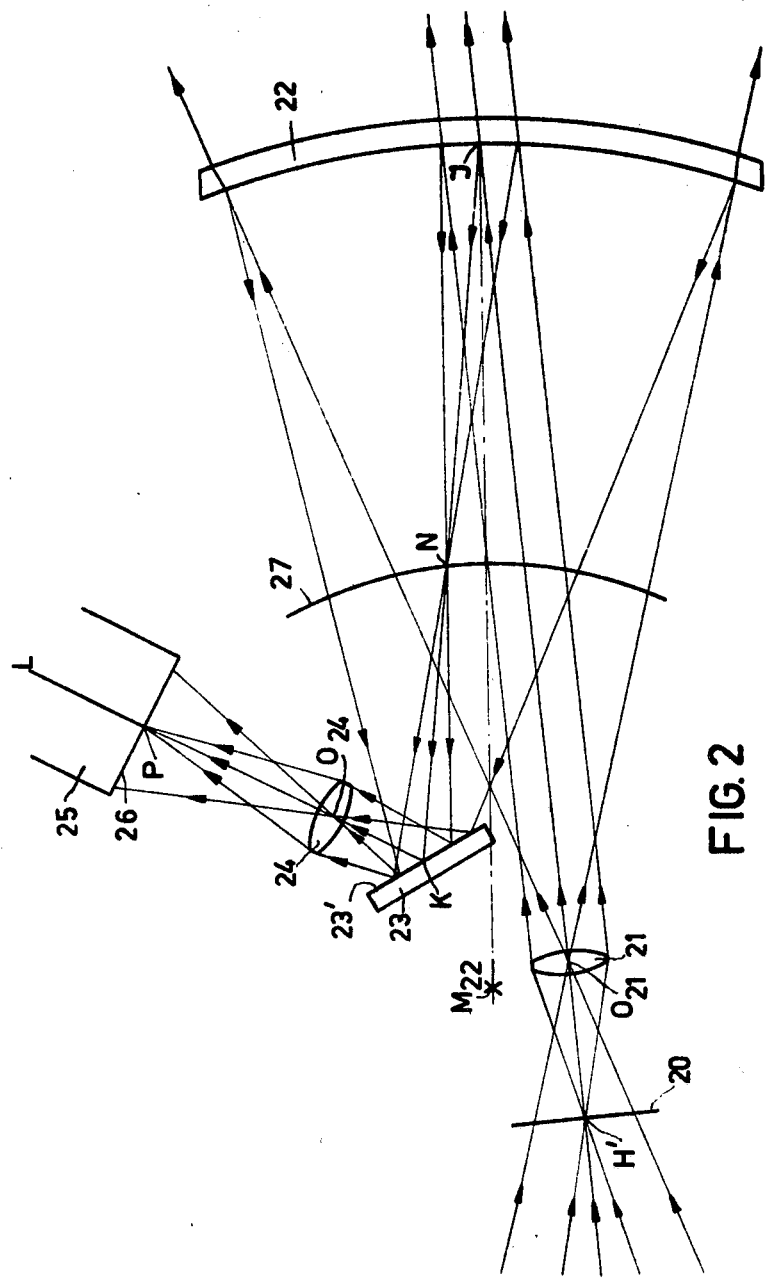

In order that the invention may be readily carried into effect, it will now be described in detail, by way of example, with reference to the accompanying diagrammatic drawings, in which:

FIGURES 1 and 2 show two embodiments in which the projection objective of the device lies directly opposite the projection screen (not shown). The embodiment of FIGURE 2 is different from that of FIGURE 1 by the presence of an additional plane mirror between the concave mirror and the camera objective.

Figure 3:
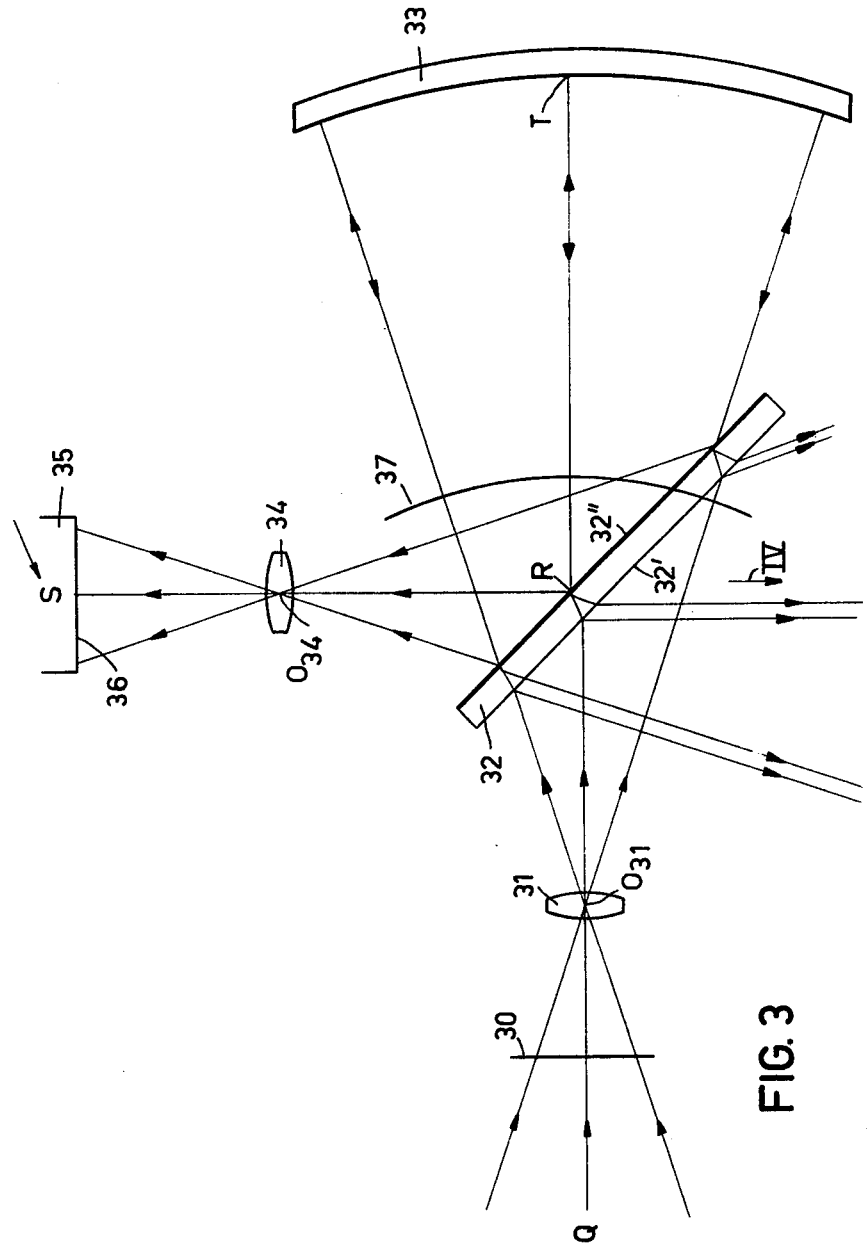

In the embodiment shown in FIGURE 3, the optical axis of the projection objective is at an angle to the direction of the projection towards the screen.

Figure 4:
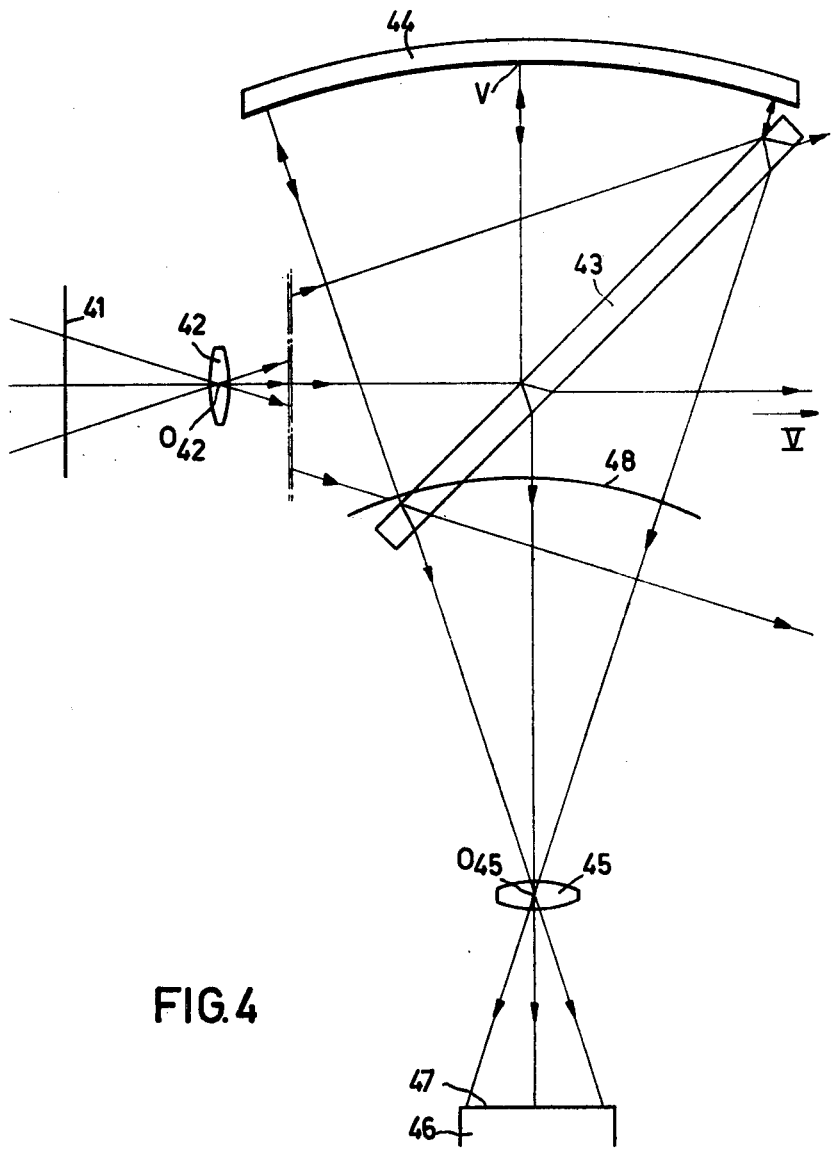
Figure 5:
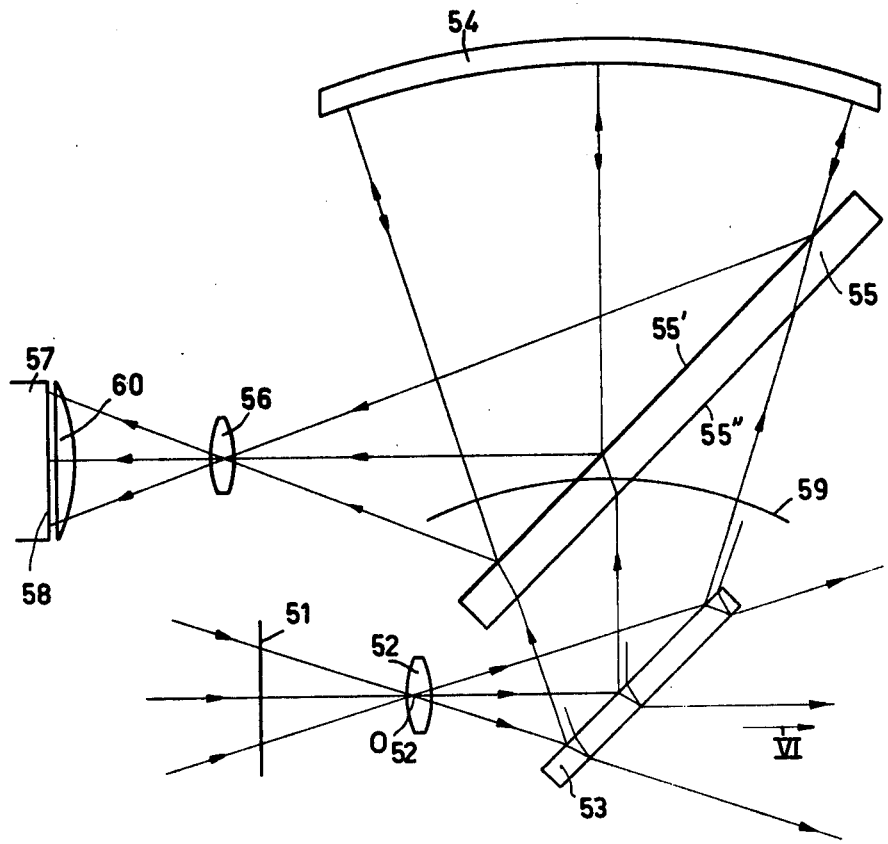

In the embodiment shown in FIGURES 4 and 5, the projection objective again lies directly opposite the screen. In the embodiment of FIGURE 5, in contrast to the structure shown in FIGURE 4, use is made of an additional plane mirror so that the camera objective can come to lie beside the projection objective.

Referring now to FIGURE 1, a film frame 10 to be projected lies substantially at focal length from a projection objective 11, shown diagrammatically. A spherical concave mirror 12 is, in this example, a spherically-curved fragment of clear glass. The projection screen is provided to the right of the concave mirror 12 at a distance which is to be regarded as infinite, the screen thus not being shown in FIGURE 1. The figure also shows a camera objective 13, a television pick-up tube 14 and a picture screen 15 thereof.

$M_{12}$ indicates the centre of curvature of the concave spherical mirror 12. The two surfaces thereof are shown concentrically for the sake of simplicity, which leads to satisfactory results in practice. The axis $M_{12}$–A of the mirror forms the bisector of the angle made by the optical axes of the projection objective 11 and of the camera objective 13. Said angle is indicated by E–A–G. Thus, the angles E–A–$M_{12}$ and G–A–$M_{12}$, which are indicated by $a$, are equal. In addition, the distances between the optical centre $O_{11}$ of the projection lens 11 and A, and between the optical centre $O_{13}$ of the camera objective 13 and A, and between $M_{12}$ and A are also the same in practice. Consequently, the emergence pupil of the projection objective 11 is projected in the entrance pupil of the camera objective 13. The projection objective 11 and the camera objective 13 are conjugated relative to the concave spherical mirror 12. This follows from the illustrated paths of rays $1_{11}$–$1_{15}$ and $1_{12}$–$1_{16}$, which, starting from $O_{11}$, after being reflected by the concave mirror 12, again intersect at $O_{13}$.

With regard to the projection of the object and hence the projection of the film frame 10, reference is made to the paths of the light rays $1_1$ and $1_2$. Since the film frame 10 lies at approximately focal length from the projection objective 11, the light rays $1_1$ and $1_2$ emerging from the centre D of the film frame 10, after having been refracted by the projection objective 11, vary their directions and extend in parallel to the optical axis E–A of the projection objective 11. These relatively parallel rays are indicated by $1_3$ and $1_5$ in FIGURE 1. They form together a parallel light beam which, after reflection on the front surface of the concave spherical mirror 12, leads to a convergence, indicated by C, in the focal area 16 of this mirror. The relevant reflected light rays are indicated by $1_7$ and $1_8$. The other image points of the spherical real image 16 of the mirror 12 are formed in a similar manner. The image 16 in turn serves as an object for the camera objective 13, which refracts the light rays $1_7$ and $1_8$ so as to obtain the directions $1_9$ and $1_{10}$, resulting in an image, at D, on the picture screen 15 of the television camera 14.

From the right-hand side of FIGURE 1, it follows that the projection screen is illuminated by the light rays $1_4$ and $1_6$ which pass through the concave plate 12 and which form the prolongations of the light rays $1_3$ and $1_5$ after slight refraction in the material of this plate.

Of the amount of light emerging from the image point B and indicated by I in FIGURE 1, the parallel light beam indicated by II thus passes to the projection screen. The remaining portion, which is included in the angle indicated by III, is received by the point D of the pick-up screen 15.

More particularly if the material of the concave spherical mirror 12 is comparatively thin and also if one surface thereof is provided with an anti-reflective layer, troublesome image duplication which might be attributable to reflections of the incident light on the two surfaces of the plate does not substantially occur.

After this explanation, all the details of FIGURE 2 will not be considered. A film frame 20 is remote from a projection objective 21 at a distance corresponding to the focal length thereof. A system of relatively parallel light beams thus emerges from the projection objective 21 and, after having been reflected by a concave spherical body 22 of clear material, results in the formation of a spherically-curved image 27 in the focal area of the mirror 22. Since in this case also the distance between the optical centre $O_{21}$ of the projection lens 21 and the point J of the mirror 22 is substantially equal to the radius of curvature of the mirror 22, as indicated by $M_{22}$–J, and is also substantially equal to the distance which, according to the refracted optical axis L–K–J, exists between the optical centre $O_{24}$ of a camera objective 24 and the mirror 22, the emergence pupil of the projection objective 21 is in this case also projected in the entrance pupil of the camera objective 24. In this embodiment also a curved real image 27, present in the focal area of the mirror 22 and produced by it, serves as an object for the camera objective 24. The centrally located point H' of the film frame 20 is thus projected at N by the projection objective 21 and the concave mirror 22, the latter point being projected by the camera objective at point P of a pick-up screen 26 of a television camera 25.

Due to the presence of a mirror 23, which is provided with a total-reflecting layer 23', it is ensured that the optical axis between the mirror 22 and the camera objective 24 is refracted. As a result thereof, the camera objective and the television camera may be arranged at areas other than in FIGURE 1. In the embodiment shown in FIGURE 2, the projection beams extend towards the projection screen in a similar manner as shown in FIGURE 1.

In the embodiment of FIGURE 3, the relative arrangement of the various optical parts is different, due to which the optical axis Q–R of a projection objective 31 is at an angle of about 90° to the direction IV towards the projection screen.

The figure shows a film frame 30 to be projected, a projection objective 31 and a plane-parallel glass plate 32 in inclined position, which is clear on its surface 32' adjacent the projection objective 31 and which is partly silvered on its other surface 32". The figure also shows a concave spherical mirror 33, a camera objective 34 and a television pick-up tube 35 having a picture screen 36. Due to the presence of the plane-parallel glass plate 32, it can be ensured in this embodiment that the centre of curvature of the concave mirror 33 lies in the optical centre $O_{31}$ of the projection objective and, according to the refracted optical axis T–R–S, also in the optical centre $O_{34}$ of the camera objective 34. This results in the emergence pupil of the projection objective 31 being projected in the entrance pupil of the camera objective 34. In this example also, the film frame 30 is projected via the projection objective 31 and the concave spherical mirror 33 as an image 37 in the focal area of the mirror 33. The image 37 serves as an object for the camera lens 34 and is thus projected, after having been reflected by the rear side of the inclined plane-parallel plate 32, via the camera objective 34 on the picture screen 36 of the pick-up tube 35.

FIGURE 3 shows the reflections by the surfaces 32' and 32" for each of the light rays emanating from the projection objective 31 and thrown onto the plate 32. This could give rise to image duplication on the projection screen. However, in practice, the distance between the reflections of the same light ray emerging from the front and rear faces of the plate 32 is found to be so small that substantially no image duplication can be seen on the projection screen which is located at a comparatively large distance. If, however, such image duplication would be experienced as troublesome, for example due to the distance between the plate 32 and the projection screen being comparatively small, this disadvantage may be mitigated in a simple manner by providing for the surfaces 32' and 32" of the plate 32 to be at an angle of at most several degrees to each other instead of extending in parallel.

In the embodiment shown in FIGURE 4, the optical axis of a projection objective 42 lies substantially in line with the main direction V of the projection beams directed towards the projection screen. A plane-parallel glass plate 43, arranged in inclined position, divides the incident light into two portions. One portion passes in the direction V towards the projection screen and hence passes through the plate 43. The other portion of the light is reflected by the plate 43 and is directed towards a concave spherical mirror 44. 45 indicates the camera objective and 46 the television pick-up tube provided with a picture screen 47. In this embodiment also, the optical centre 42 of the projection objective, as measured along the refracted optical axis leading from the spherical mirror 44, and the optical centre $O_{45}$ of the camera objective 45 are remote from the point of intersection V of the mirror 44 and its axis at a distance corresponding to the radius of curvature of the mirror 44. In addition, the centre of curvature of the mirror 44 lies at the optical centre $O_{42}$ of the projection objective 42 and at the optical centre $O_{45}$ of the camera objective 45. Light rays originating from a film frame 41, which is remote from the projection objective a distance equal to the focal length thereof, after refraction by the projection lens 42 and after reflection by the surface of the plane-parallel plate 43 and the surface of the spherical concave mirror 44 and after passing through the plate 43, are concentrated in the spherically-curved focal area of the mirror 44 where a real image 48 of the film frame 41 is produced. The image 48 serves as an object for the camera objective 45 so that an image is also produced on the screen 47 of the pick-up tube 46 of the television camera. In this example also, the emergence pupil of the projection objective is projected in the entrance pupil of the camera objective 45 due to the particular choice of the arrangement and dimensions.

FIGURE 4 shows diagrammatically the lateral displacements of the light rays in the plane-parallel plate 43 and the double reflections on the two surfaces of the plate. However, such displacements are not experienced as troublesome in practice. If desired, the plate 43 may have a slightly wedge-shaped form.

The elements forming together the supplementary system which is to be arranged in front of an existing projector may be mounted, if desired, on a common carrier or slide. The elements concerned are the concave mirror 44, the plane-parallel plate 43, the camera lens 45 and the pick-up tube 46. Each element can be adjusted individually relative to the carrier.

The embodiment shown in FIGURE 5 is fundamentally identical with that of FIGURE 4, except that in the embodiment of FIGURE 5 an additional plane-parallel-plate is provided which permits a different arrangement of the camera objective relative to the projection objective. The figure shows a film frame 51, a projection objective 52 and the optical centre $O_{52}$ thereof. A plane-parallel glass plate 53 is arranged in inclined position directly behind the projection objective 52. In this example also, the optical axis of the projection objective 52 substantially coincides with the direction VI of the projection towards the screen. As measured according to the optical axis, a concave spherical mirror 54 is provided behind the projection objective 52 at a distance corresponding to the radius of curvature of the mirror 54. Between the plane-parallel plate 53 and the concave spherical mirror 54 there is arranged a second plane-parallel plate 55 which is partly reflective and partly translucent on the side 55' adjacent the concave spherical mirror 54. Its other surface 55" is clear. A camera objective 56 and a pick-up tube 57 of a television camera, having an image plane 58, are arranged behind the concave spherical mirror 54, as determined according to the refracted optical axis.

The film frame 51 is projected via the projection objective 52 onto the projection screen (not shown) and also via the concave spherical mirror 54 in the focal plane thereof. The image 59, located in the focal plane, is in turn projected via the camera objective 56 on the image plane 58 of the pick-up tube of the television camera. In this embodiment also, the emergence pupil of the projection objective 52 is projected in the entrance pupil of the camera objective 56 due to the particular relative arrangement of the parts.

In this embodiment, a positive correcting lens 60 is positioned directly in front of the image plane 58 of the television pick-up tube in order to correct the curvature of the focal field at the image plane.

We claim:

1. A device for projecting the configurations on a carrier simultaneously on a projection screen and a pick-up tube of a television camera with the same projection objective, comprising a projection objective located at a distance from said carrier at least equal to the focal length of said projection objective, a television camera objective arranged in front of the pick-up tube of said television camera, a concave spherical mirror being constituted of optically clear materials whereby the projection beams directed toward said projection screen pass through said mirror, said projection objective and said camera objective having conjugated positions relative to said spherical mirror, and the distance between each of said objectives and said concave spherical mirror as measured along the optical axes corresponding at least substantially to the radius of curvature of said concave spherical mirror.

2. A device for projecting the configurations on a carrier simultaneously on a projection screen and a pick-up tube of a television camera with the same projection objective, comprising a projection objective located at a distance from said carrier at least equal to the focal length of said projection objective, a television camera objective arranged in front of the pick-up tube of said television camera, a concave spherical mirror being constituted of optically clear materials whereby the projection beams directed toward said projection screen pass through said mirror, said projection objective and said camera objective having conjugated positions relative to said spherical mirror, and the distance between each of said objectives and said concave spherical mirror as measured along the optical axes corresponding at least substantially to the radius of curvature of said concave spherical mirror, and a plane mirror arranged in an angular position with respect to the path of rays between said concave mirror and said camera objective.

References Cited by the Examiner

UNITED STATES PATENTS

| | | | |
|---|---|---|---|
| 1,783,998 | 12/30 | Chretien | 88—57 |
| 2,076,103 | 4/37 | Thorner | 352—89 |
| 2,553,903 | 5/51 | Dufour | 352—89 |
| 2,727,427 | 12/55 | Jenkins | 352—89 |
| 2,727,429 | 12/55 | Jenkins | 352—89 |
| 2,742,817 | 4/56 | Altman | 352—57 |
| 2,874,605 | 2/58 | Williamson | 88—2.3 |

FOREIGN PATENTS 663,239  8/38  Germany.

NORTON ANSHER, *Primary Examiner.*

EMIL G. ANDERSON, WILLIAM MISIEK, *Examiners.*